United States Patent [19]

Baumgarten

[11] Patent Number: 4,958,536
[45] Date of Patent: Sep. 25, 1990

[54] CABLE CONTROL SYSTEM

[75] Inventor: John M. Baumgarten, W. Bloomfield, Mich.

[73] Assignee: Babcock Industries, Inc., Fairfield, Conn.

[21] Appl. No.: 326,926

[22] Filed: Mar. 22, 1989

[51] Int. Cl.⁵ .............................................. F16C 1/10
[52] U.S. Cl. .............................. 74/501.5 R; 74/501.6; 74/535
[58] Field of Search ............... 74/501.6, 501.5 R, 502, 74/502.2, 502.6, 523, 531, 529, 535, 577, 575

[56] References Cited

U.S. PATENT DOCUMENTS

| | | | |
|---|---|---|---|
| 1,288,362 | 12/1918 | Yeider | 74/535 X |
| 2,905,017 | 9/1959 | Randolph | 74/489 |
| 3,353,636 | 11/1967 | Ridenour | 74/535 X |
| 3,789,967 | 2/1974 | Dau et al. | 74/501.5 R X |
| 4,399,901 | 8/1983 | Kobayashi et al. | 74/501.5 R X |
| 4,633,724 | 1/1987 | Mochida | 74/501.6 X |
| 4,738,156 | 4/1988 | Pipon et al. | 74/531 |
| 4,793,206 | 12/1988 | Suzuki | 74/501.5 R |
| 4,854,187 | 8/1989 | Walters | 74/501.5 R X |

Primary Examiner—Rodney M. Lindsey
Attorney, Agent, or Firm—Barnes, Kisselle, Raisch, Choate, Whittemore & Hulbert

[57] ABSTRACT

A cable control system for releasing a spring loaded device such as a latch or brake by a cable wherein one end of the strand of the cable is connected to the latch and the other end thereof is attached to a member that is yieldingly urged in a direction to maintain tension on the strand. An operating lever is pivoted adjacent the member and an arm is pivoted to said lever such that movement of the lever in one direction will cause the arm to engage the member and apply tension to the strand to release the latch.

40 Claims, 7 Drawing Sheets

CABLE CONTROL SYSTEM

This invention relates to cable control systems and particularly to manually operated systems for releasing latches or the like.

BACKGROUND AND SUMMARY OF THE INVENTION

In automotive vehicles, it is common to provide latches to hold devices in position, for example, a hood or fuel filler door. In such systems, a latch is usually provided to hold the device in a particular position. The latch may be electrically or manually operated. In a manual type system, a cable strand extends from the latch to a hand lever adjacent the driver of the vehicle so that when the hand lever is pulled, the latch is released.

Among the objectives of the invention are to provide such a cable control system wherein the control is adjusted each time the system is actuated; wherein the system will accommodate increases or decreases in tension as might be desired; wherein the geometry of the system of lever and arm can be readily adjusted relative to each other to provided varying forces as may be desired; wherein the system can operate to provide a constant force; wherein the system may be self-locking; and which utilizes a limited number of relatively inexpensive parts that are easily assembled maintained and replaced.

In accordance with the invention, a cable control system for releasing a spring loaded device such as a latch or brake by a cable wherein one end of the strand of the cable is connected to the latch comprises a member that is yieldingly urged in a direction to maintain tension on the strand. An operating lever is pivoted adjacent the member and an arm is pivoted to the lever such that movement of the lever in one direction will cause the arm to engage the member and apply tension to the strand to release the latch.

DESCRIPTION

Figure 1:
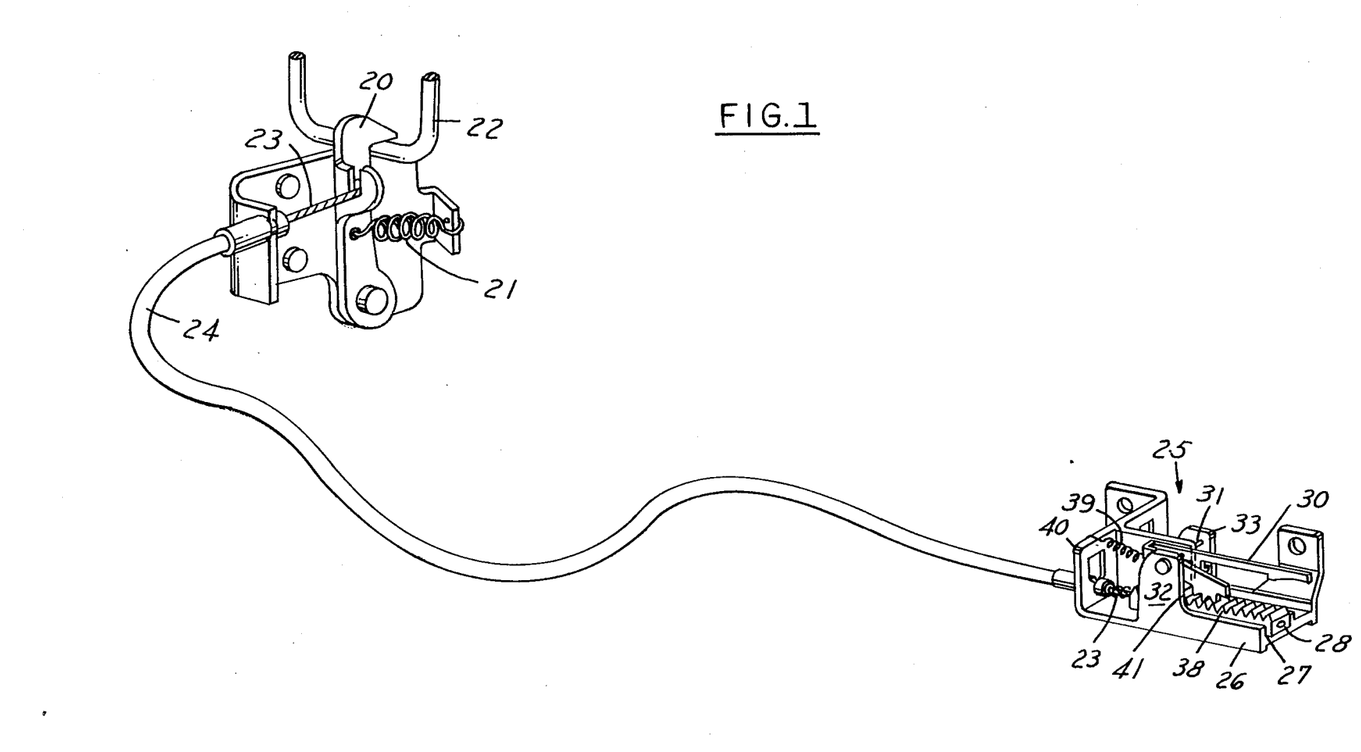
FIG. 1 is a partly diagrammatic perspective view of a cable control system embodying the invention.

Referring to FIG. 1, the cable control system embodying the invention is shown in connection with a spring loaded device such as a latch 20 which is operatively connected to a device such as a hood or fuel filler door. The latch 20 is normally yieldingly urged into locking position by a spring 21 for engagement with a portion 22 of the device being locked. A cable strand 23 extends through a conduit 24 to a control device 25 embodying the invention.

Referring to FIGS. 2–6, the control device 25 comprises a bracket 26 that defines a slide 27 in which a rack 28 is positioned. The rack 28 is connected to the cable strand 23 and is yieldingly urged by a coil spring 29, interposed between the bracket 26 and the rack 28, to continuously tension the rack 28 in a direction such as to apply tension to the cable strand 23.

Figure 2:
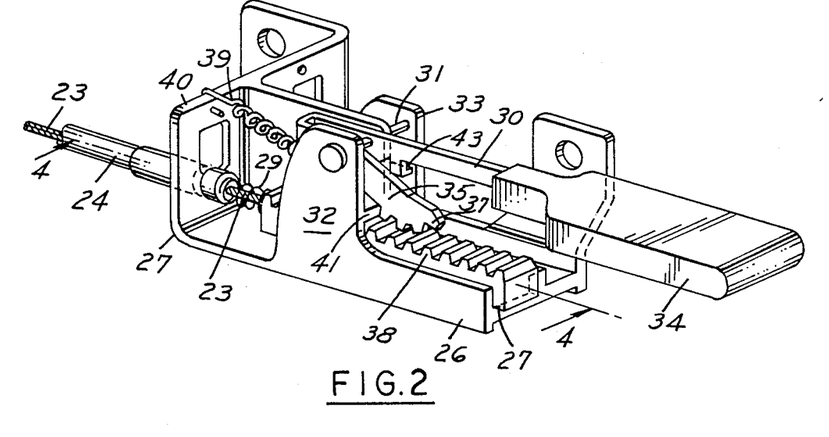
FIG. 2 is a perspective view on an enlarged scale of a portion of the system shown in FIG. 1.
Figure 3:
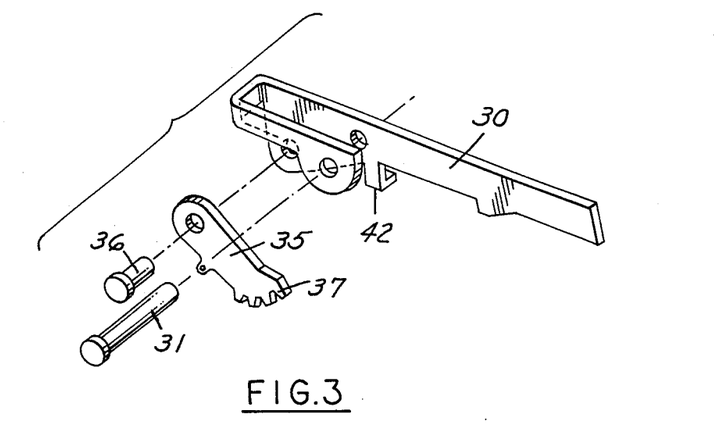
FIG. 3 is an exploded view of a portion of the system shown in FIG. 2.
Figure 4:
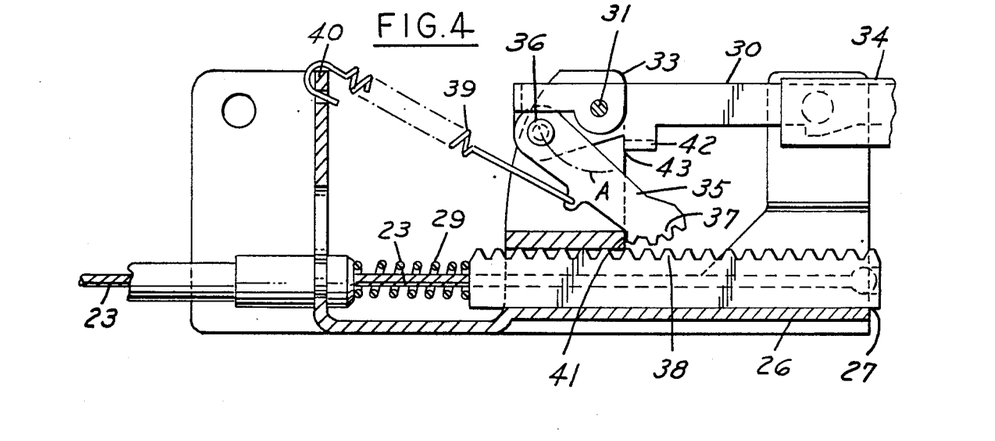
FIG. 4 is a vertical sectional view of the portion of the system shown in FIG. 2.

A lever 30 is pivoted intermediate its ends on a pin 31 extending between walls 32, 33 of bracket 26 and is provided with a handle portion 34 on one end. An arm 35 is pivoted to the other end of lever 30 by pin 36 and is provided with gear teeth 37 which are adapted to engage teeth 38 on the upper surface of rack 28. A return spring 39 extends between the arm 35 and rear wall 40 of bracket 26 to yieldingly urge the arm 35 against a stop 41 on bracket 26.

Figure 7:
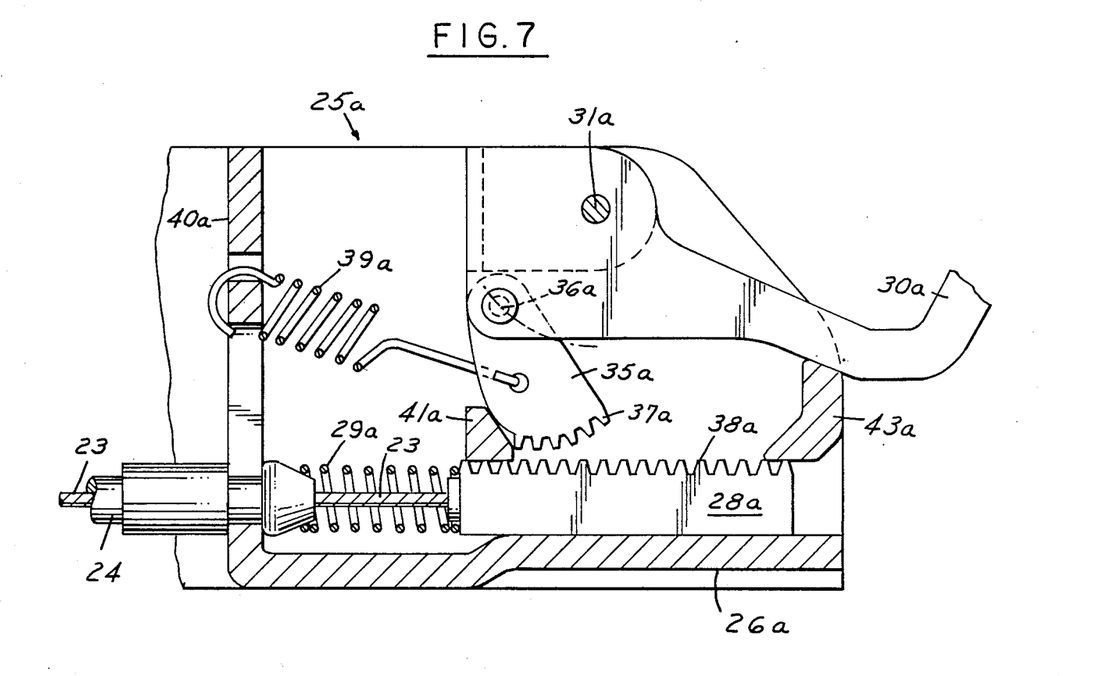
FIG. 7 is a fragmentary sectional view of a modified form of an apparatus utilized in the system.

As shown in FIG. 2, the lever 30 is further formed with a laterally extending tab 42 in the form of a hook that is adapted to engage a portion 43 on bracket 26 to limit the downward movement of the lever 30 as shown in FIG. 2. Alternatively, a stop 43a may be provided on the bracket 26a for engaging another portion of the lever 30a as shown in FIG. 7.

Bracket 26, rack 28, lever 30, arm 35 and the associated pins may be made of suitable metal materials such as sintered or forged steel or die cast zinc or die cast aluminum.

Referring to FIG. 4, by lifting the lever 30, arm 35 is caused to move downwardly and the pivot axis of pin 36 moves through an arc A.

When it is desired to release the latch 20, the lever 30 is lifted causing the arm 35 to move downwardly to engage teeth 37 with the teeth 38 of the rack 28 and apply a force tensioning the table strand 23 sufficiently to permit release of the latch 20. Upon release of the lever 30, the rack 28 is released and returned to its original position by operation of the spring 21 of the latch 20. The lever 30 is returned to its initial position on portion 43 by operation of return spring 39 acting on arm 35. In this final condition, the spring 29 maintains the initial tension on the strand 23.

Figure 5:
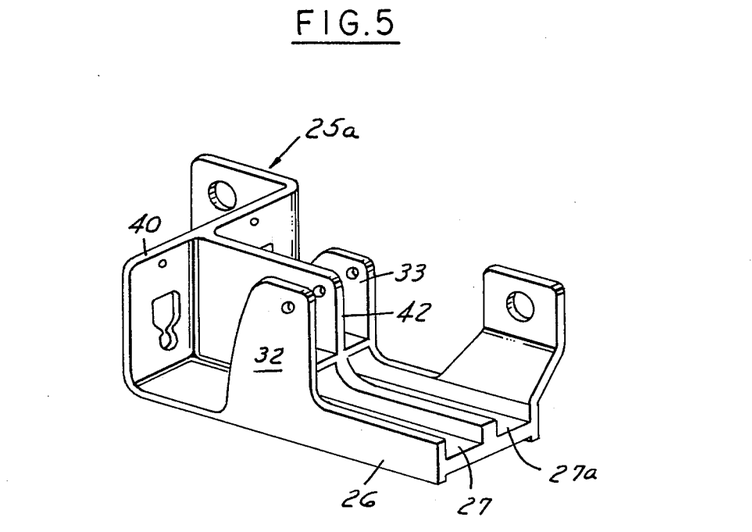
FIG. 5 is a perspective view of a portion of a modified form of an apparatus utilized in the system.
Figure 6:
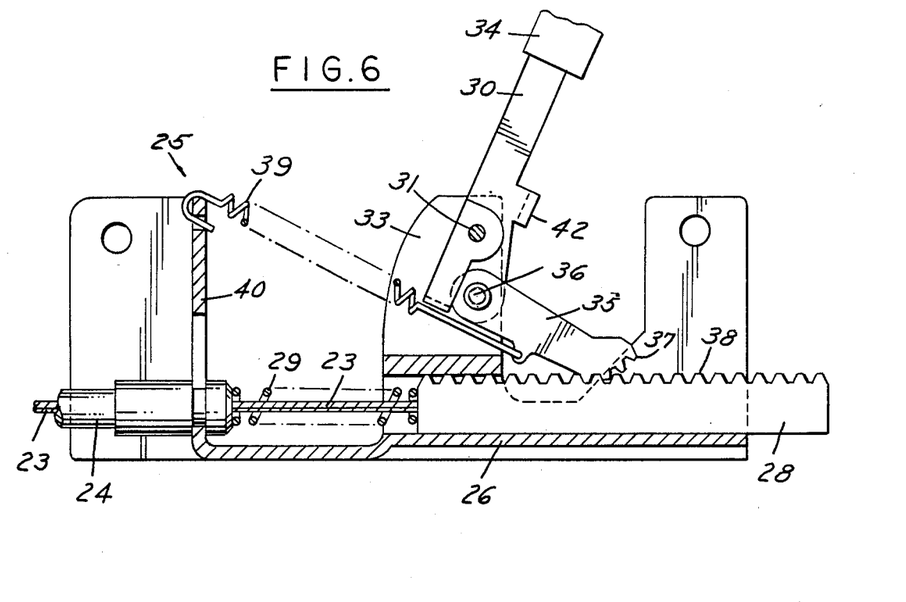
FIG. 6 is a view similar of FIG. 4 showing parts in a different operative position.

Referring to FIG. 5, a modified control device 25a has the bracket 26 provided with a second track 27a for receiving a second rack such that dual controls in the form of levers may be provided to another device to be controlled. This provides a convenient location for all latch controls.

Figure 8:
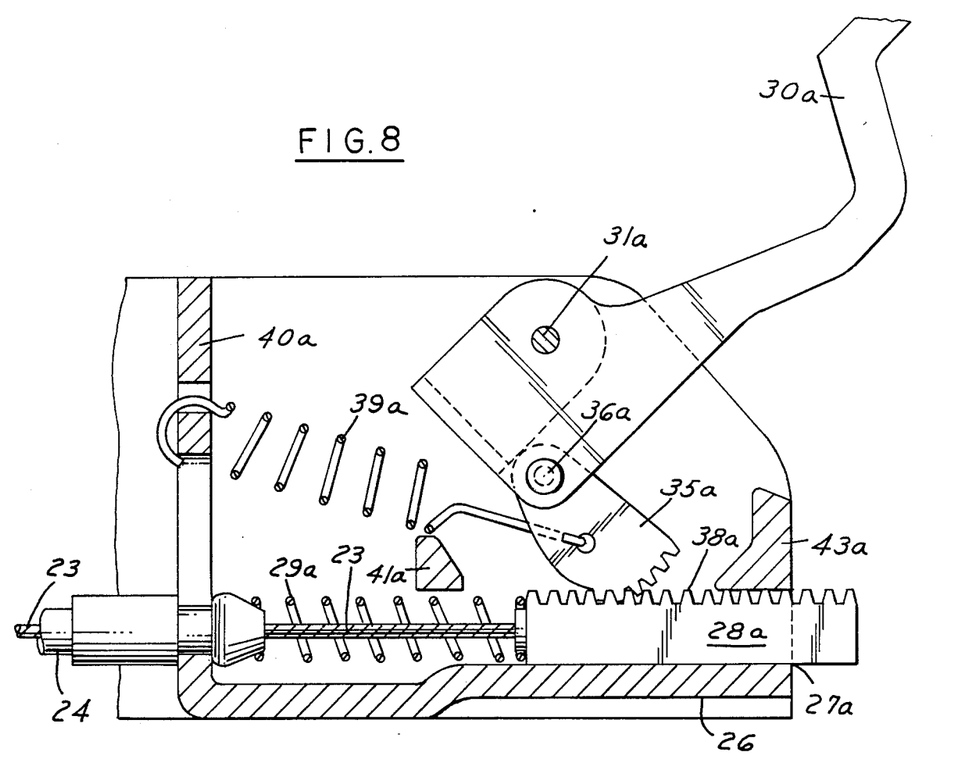
FIG. 8 is a view similar to FIG. 7 showing parts in a different operative position.
Figures 9, 10:
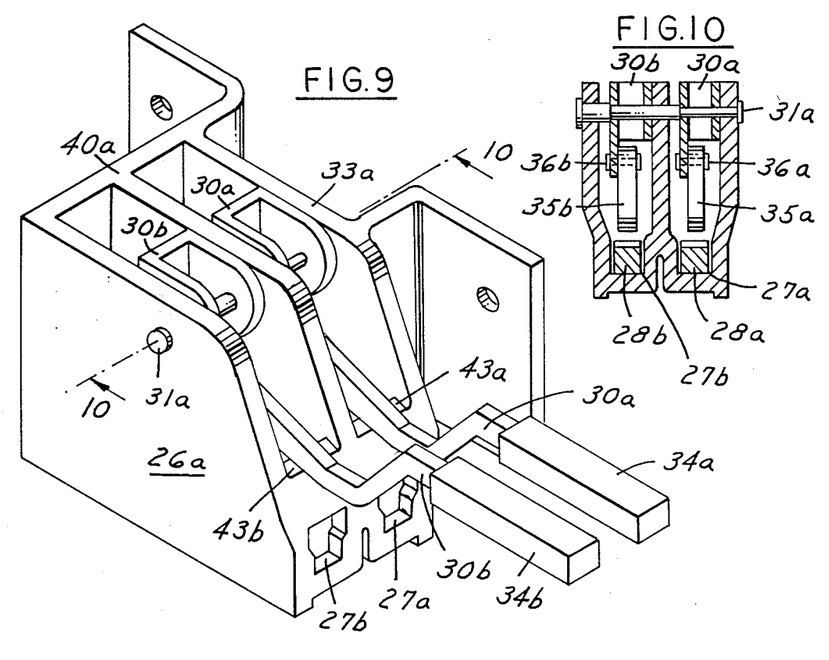
FIG. 9 is a perspective view of a modified form of an apparatus utilized in the system.
FIG. 10 is a fragmentary sectional view taken along the line 10—10 in FIG. 9.

Referring to FIGS. 7 and 8, the modified device 25a has a shorter arm 35a having a 28 tooth 48 pitch design.

The tension spring 39a that urges the arm 35a against stop 41a is repositioned lower on rear wall 40a.

When it is desired to release the latch 20 in this embodiment, the lever 30a is lifted causing the arm 35a to move downwardly and engage teeth 37a with the teeth 38a of rack 28a and apply a force tensioning cable 23 sufficiently to permit the release of the latch 20. Stop 43a also prevents the arm 35a and rack 28a from moving any further. When the arm 35a is against stop 43a, the operator releases the lever 30a to its original position.

Figure 11:
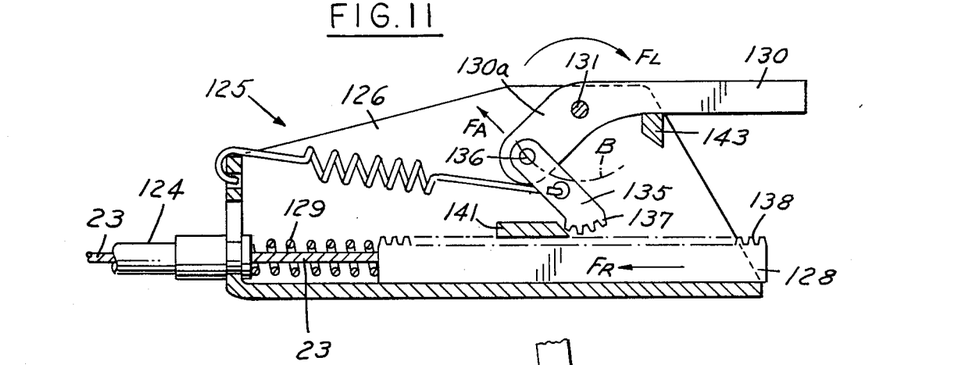
FIG. 11 is a vertical sectional view of a modified form of an apparatus utilized in the system.
Figure 12:
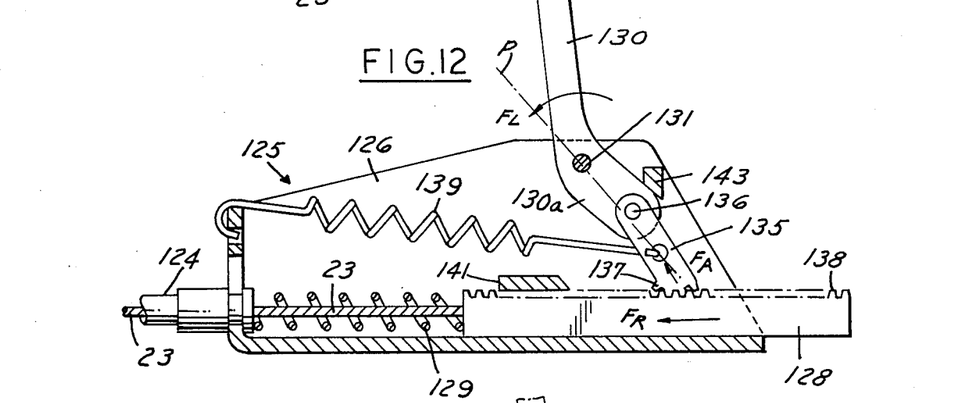
FIG. 12 is a view similar to FIG. 11 showing parts in a different operative position.

FIGS. 11-12 show a self-locking lever control device 125. This control device 125 comprises a lever 130 pivoted intermediate its ends on a pin 131 extending between walls of bracket 126. Lever 130 defines a handle 134 at one end and on the other end of the lever 130 extending beyond the pivot 131 is formed a lower portion at an angle to the handle 134. An arm 135 is pivoted to the lower portion of lever 130 by pin 136 and is provided with teeth 137 which are adapted to engage teeth 138 of rack 128. After lever 130 is lifted to an upward position, the arm 135 is moved downward to engage teeth 137 with teeth 138. During the swinging movement of the arm 135 the pivot axis 136 moves in an arc B to and over center position bringing the portion 130a to engage with a stop 143. During the movement of the lever 130, the pivot axis 136 of arm 135 moves from one side of a plane, defined by pivot axis of pin 131 and the point of contact or tangency 137 of the teeth on the arm 135 with the teeth 138 on the rack 128 to the other side of the plane so that the lever is locked in engagement position.

In this device three main forces interact to release the latch. There is a force $F_L$ applied to the end of the lever 130, a force $F_A$ applied through the arm 135, and a force $F_R$ applied through the rack 128. The force $F_L$ lifts lever 130 and transmits force $F_A$ through arm 135 which transmits force $F_R$ through the rack 128 and tensions the strand 23.

In the initial position as shown in FIG. 11, the return spring 139 creates a force on the arm 135 in the direction of the arrow $F_A$ which causes a force on the lever 130 to move in the clockwise direction about pivot 131 as shown by arrow $F_L$ and spring 129 causes a force on the rack 128 in the direction of arrow $F_R$ and a tension force on the strand 23.

FIG. 12 shows the control device in a latch release position, spring 129 and latch spring 21 causes a force on the rack 128 in the direction of arrow $F_R$, but because teeth 137 and 138 are meshed together a resultant force is created in the direction of the arrow $F_A$. This force causes a counter-clockwise force $F_L$ on the lever 130 about pivot pin 131 as shown in direction of arrow $F_L$ because the arm 135 has crossed over the plane defined by pivot pin 131 and the point of contact between teeth 137 and 138. The force $F_L$ is opposed by an equal but opposite force in stop 143 and therefore locks the lever in the position shown in FIG. 12.

To release the lever from this position an opposite force greater than $F_L$ is required at the end of lever 130 to return it to its original position of FIG. 11.

Figure 13:
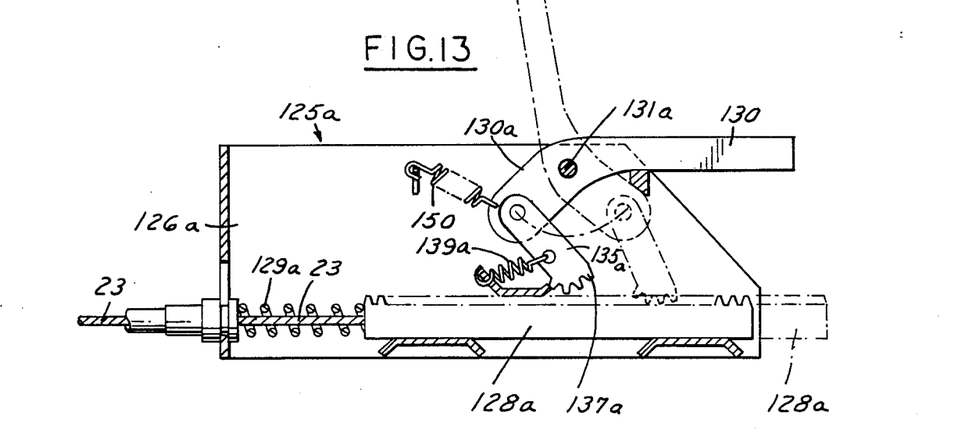
FIG. 13 is a vertical sectional view of a modified form of an apparatus utilized in the system.

FIG. 13 shows an alternative embodiment which has an additional spring 150 attached between the bracket 126a and lever arm 130a. When the lever 130a is in the latch release position as shown in phantom, spring 150 introduces a clockwise force about pivot 131a that opposes the counter-clockwise locking force caused by arm 135a. This clockwise force of additional spring 150 reduces the force necessary to overcome the locking force and to return lever 130 to its initial position as shown in FIG. 13 in solid.

Figures 14, 17:
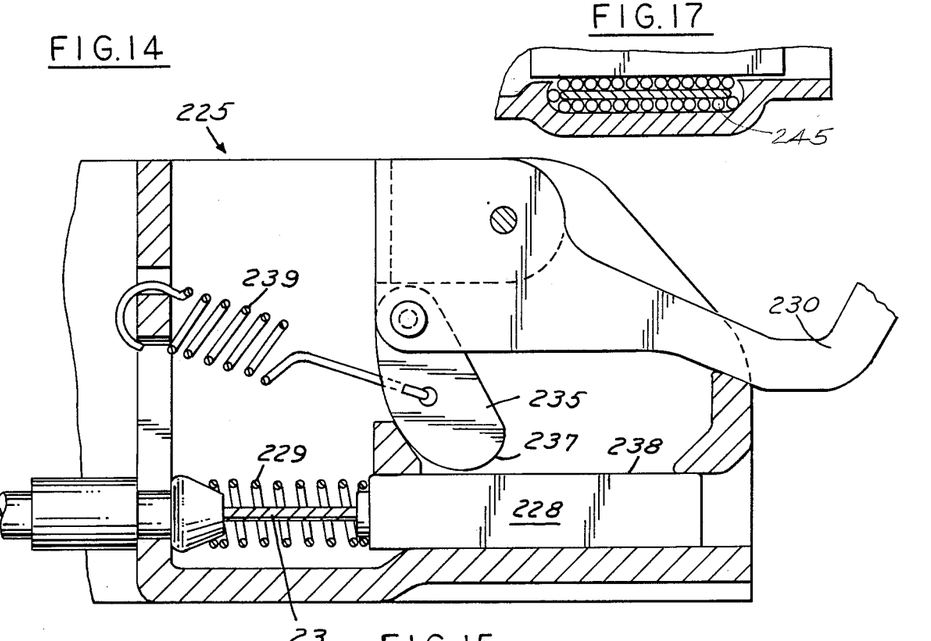
FIG. 14 is a fragmentary sectional view of a modified form of an apparatus utilized in the system.
FIG 17 is a fragmentary sectional view of a further modified form of apparatus.

FIG. 14 shows an alternative embodiment of a control device 225. The device 225 has a member 228 with a top surface 238 attached to strand 23 instead of a rack with teeth and an arm 235 having a surface 237 instead of teeth. To release the latch 20, lever 230 is lifted and moves arm 235 towards member 228. The surface 237 releasably contacts surface 238 to move block 228 and tension cable strand 23. Surfaces 237 and 238 may be both rough, grooved or knurled surfaces or one surface may be rough and the other surface smooth. Member 228 or arm 235 may be made of polyurethane or hard rubber.

Figure 15:
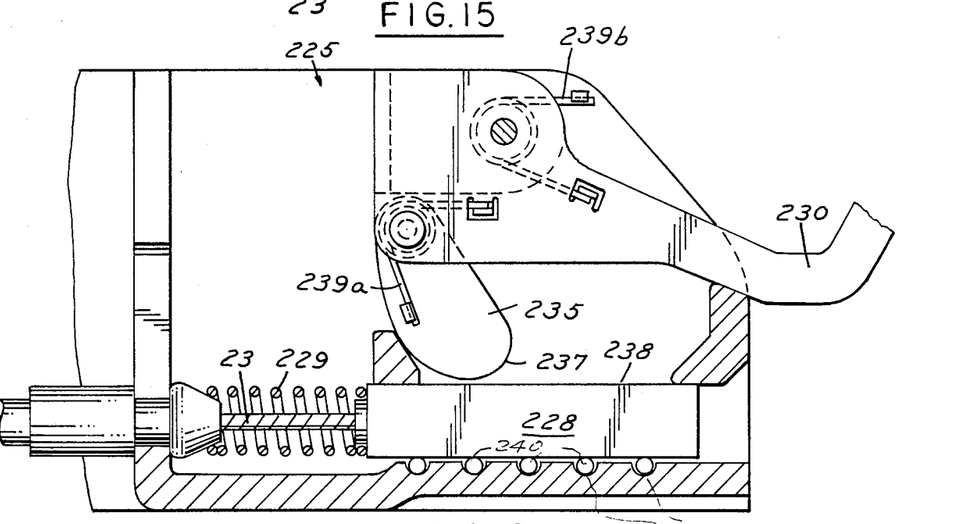
FIG. 15 is a fragmentary sectional view of a further modified form of an apparatus utilized in the system.

The form control device shown in FIG. 15 is similar to that shown in FIG. 14 except that in place of the spring 239, torsion springs 239A and 239B are provided. Torsion spring 239A is mounted on the pivot of the arm 235 and has one end fixed to the bracket and the other end fixed to the arm. Torsion spring 239B is mounted about the pivot of the lever 230 to the bracket and has one end fixed to the bracket and the other end fixed to the lever. In addition, in this form a plurality of cylindrical roller bearings 240 are provided on the underside of the member 228 in grooves 241 in the base of the bracket and function to minimize the friction between the member 228 and the bracket, thereby providing low friction means therebetween.

Figure 16:
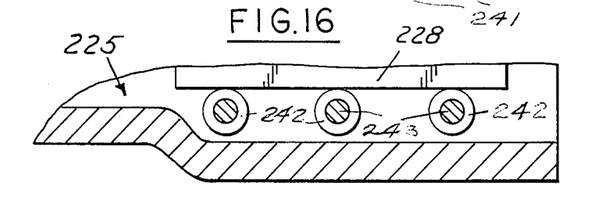
FIG. 16 is a fragmentary sectional view of another form of an apparatus utilized in the system.

In the form shown in FIG. 16, low friction means are provided by rollers 242 mounted on shafts 243 between the side walls of the bracket to serve a similar function.

In the form shown in FIG. 17, the low friction means comprises a reciprocating roller bearing assembly wherein cylindrical rollers 245 travel in an endless path and define a low friction contact place for member 228.

It can be seen that in accordance with the invention, the invention provides a cable control system wherein the control is adjusted each time the system is actuated by having the rack 28 or member 228 connected to cable strand 23 yieldingly urged by a coil spring 29 so as to apply tension to the cable strand 23; wherein the cable control system may be self-locking by changing the configuration of the arm and lever so that the arm creates a counter-clockwise force about the pivot point of the lever and the stop is relocated to oppose such force.

In accordance with the invention, all embodiments of the cable control system have a control device which utilizes a limited number of relatively inexpensive parts that are easily assembled and maintained and replaced. The only bearing parts necessary are the lever and the arm.

The invention claimed is:

1. A cable control system comprising:
   a spring loaded latch,
   a cable having a strand attached at one end and to said latch,
   means for maintaining tension on said strand in a direction away from said latch,
   control means adjacent the other end of said strand and adapted in one position to engage said strand and place a tension on said strand to release said latch and in another position to release said strand such that said means for applying tension to said strand adjusts the tension on said strand,
   said control means including a member on said other end of said strand, a bracket, a lever pivoted to said bracket, said bracket defining a track for said member on said other end of said strand, an arm pivoted to said lever, a stop on said bracket holding said arm out of engagement with said member, and means yieldingly urging said arm toward said stop, said lever being operable to move said arm into engagement with said member.

2. The cable control system set forth in claim 1 wherein said member on said strand has a roughened surface adapted to be contacted by said arm.

3. The cable control system set forth in claim 1 wherein said arm is made of metal.

4. The cable control system set forth in claim 1 wherein said arm is made of hard plastic.

5. The cable control system set forth in claim 1 wherein said arm is made of polyurethane.

6. The cable control system set forth in claim 1 wherein said arm is made of hard rubber.

7. The cable control system set forth in claim 1 wherein said member is a rack having teeth on its upper surface and said arm has gear teeth adapted to mesh with said teeth of said rack.

8. A cable control system comprising:

a spring loaded latch, a cable having a strand attached at one end to said latch, means for maintaining tension on said strand in a direction away from said latch, control means adjacent the other end of said strand and adapted in one position to engage said strand and place a tension on said strand to release said latch and in another position to release said strand such that said means for applying tension to said strand adjusts the tension on said strand, a lever adapted to be manually operated and an arm pivoted on said lever to engage said member, said control means being constructed and arranged to hold said strand in said one position, said control means including a member on said other end of said strand and comprising a second stop, the pivot axis of said arm on said lever being positioned such that as the lever is moving about its pivot axis, the pivot axis of the arm moves from one side of a plane defined by the pivot axis of said lever and the point of engagement of the arm with said member to the other side of said plane to bring said lever into engagement with said second stop.

9. The cable control system set forth in claim 8 further comprising means yieldingly urging said arm toward said stop wherein said means yieldingly urging said arm toward said stop comprises a tension spring.

10. The cable control system set forth in claim 8 further comprising means yieldingly urging said arm toward said stop wherein said means yieldingly urging said arm toward said stop comprises a torsion spring.

11. The cable control system set forth in claim 8 wherein said arm is made of metal.

12. The cable control system set forth in claim 8 wherein said arm is made of hard plastic.

13. The cable control system set forth in claim 12 wherein said arm is made of polyurethane.

14. The cable control system set forth in claim 8 wherein said arm is made of hard rubber.

15. The cable control system set forth in claim 8 wherein said member includes a rack having teeth on its upper surface and said arm pivoted to said lever having gear teeth adapted to mesh with said teeth of said rack.

16. The cable control system set forth in claim 8 wherein said means for maintaining tension on the strand comprises a compression spring.

17. The cable control system set forth in claim 8 including low friction means engaging said member.

18. A cable control system comprising a cable having a strand adapted to be attached to one end to a latch, means for maintaining tension on said strand in a direction away from the latch, control means adjacent the other end of said strand and adapted in one position to engage said strand and place a tension on said strand to release said latch and in another position to release said strand such that said means for applying tension to said strand adjusts the tension on said strand, said control means including a member on said other end of said strand, a lever adapted to be manually operated, and an arm being pivoted on said lever and adapted to engage said member, a stop normally holding said arm out of engagement with said member, and means yieldingly urging said arm toward said stop, said control means being constructed and arranged to hold said strand in said one position, said control means comprising a second stop, the pivot axis of said arm on said lever being positioned such that as the lever is moving about its pivot axis, the pivot axis of the arm moves from one side of a plane defined by the pivot axis of said lever and the point of engagement of the arm with said member to the other side of said plane to bring said lever into engagement with said second stop.

19. The cable control system set forth in claim 18 wherein said means yieldingly urging said arm toward said stop comprises a tension spring.

20. The cable control system set forth in claim 18 wherein said means yieldingly urging said arm toward said stop comprises a torsion spring.

21. The cable control system set forth in claim 18 wherein said member on said strand has a roughened surface adapted to be contacted by said arm.

22. The cable control system set forth in claim 21 wherein said arm is made of hard plastic.

23. The cable control system set forth in claim 22 wherein said arm is made of polyurethane.

24. The cable control system set forth in claim 21 wherein said arm is made of hard rubber.

25. The cable control system set forth in claim 18 wherein said arm is made of metal.

26. The cable control system set forth in claim 18 wherein said member is a rack having teeth on its upper surface and said arm has gear teeth adapted to mesh with said teeth of said rack.

27. The cable control system set forth in claim 18 wherein said means for maintaining tension on the strand comprises a compression spring.

28. A cable control system comprising a cable having a strand adapted to be attached to one end to a latch, means for maintaining tension on said strand in a direction away from the latch, control means adjacent the other end of said strand and adapted in one position to engage said strand and place a tension on said strand to release said latch and in another position to release said strand such that said means for applying tension to said strand adjusts the tension on said strand, said control means including a bracket, a lever pivoted on said bracket, said bracket defining a track for a member on said other end of said strand, an arm being pivoted to said lever, a stop on said bracket holding said arm out of engagement with said member, and means yieldingly urging said arm toward said stop, said lever being operable to move said arm into contact with said member.

29. The cable control system set forth in claim 28 wherein said means yieldingly urging said arm toward said stop comprises a tension spring.

30. The cable control system set forth in claim 28 wherein said means yieldingly urging said arm toward said stop comprises a torsion spring.

31. The cable control system set forth in claim 30 including a second torsion spring yieldingly urging said lever.

32. The cable control system set forth in claim 28 wherein said member on said strand has a roughened surface adapted to be contacted by said arm.

33. The cable control system set forth in claim 32 wherein said arm is made of metal.

34. The cable control system set forth in claim 32 wherein said arm is made of hard plastic.

35. The cable control system set forth in claim 34 wherein said arm is made of polyurethane.

36. The cable control system set forth in claim 32 wherein said arm is made of hard rubber.

37. The cable control system set forth in claim 28 wherein said member is a rack having teeth on its upper surface and said arm has gear teeth adapted to mesh with said teeth of said rack.

38. The cable control system set forth in claim 28 wherein said control means is constructed and arranged to hold said strand in said one position.

39. The cable control system set forth in claim 28 wherein said means yieldingly urging said arm toward said stop comprises a tension spring.

40. The cable control system set forth in claim 39 wherein said means yieldingly urging said arm toward said stop comprises a torsion spring.

* * * * *